United States Patent [19]

Kawabata

[11] Patent Number: 4,642,991
[45] Date of Patent: Feb. 17, 1987

[54] TURBOCHARGER CONTROL SYSTEM

[75] Inventor: Yasuhiro Kawabata, Anjo, Japan

[73] Assignee: Aisin Seiki Kabushiki Kaisha, Kariya, Japan

[21] Appl. No.: 780,840

[22] Filed: Sep. 27, 1985

Related U.S. Application Data

[63] Continuation-in-part of Ser. No. 726,915, Apr. 4, 1985, abandoned, which is a continuation of Ser. No. 452,924, Dec. 27, 1982, abandoned.

[30] Foreign Application Priority Data

Dec. 30, 1981 [JP] Japan ................................. 56-211681

[51] Int. Cl.$^4$ ............................................ F02B 37/12
[52] U.S. Cl. ........................................................ 60/602
[58] Field of Search .................. 60/600, 601, 602, 603

[56] References Cited

U.S. PATENT DOCUMENTS 3,089,304 5/1963 Bozzola .................................. 60/602
3,257,796 6/1966 Updike .................................... 60/602
4,311,008 1/1982 Yamada .................................. 60/602

Primary Examiner—Michael Koczo
Attorney, Agent, or Firm—Oblon, Fisher, Spivak, McClelland & Maier

[57] ABSTRACT

A turbocharger control system, utilized in an internal combustion engine, which includes a bypass passage bypassing exhaust gases directly to an exhaust treatment device around a turbocharger turbine, and a waste gate valve connected to an actuator by means of a link mechanism. The waste gate valve is a normally opened type valve and is maintained so as to be opened in case problems are encountered in the actuator operating the waste gate valve or in the link mechanism attached to the actuator, thereby reducing resultant damage to pipe members forming a passage from a turbocharger compressor to a throttle valve.

9 Claims, 2 Drawing Figures

TURBOCHARGER CONTROL SYSTEM

BACKGROUND OF THE INVENTION

This is a continuation-in-part of U.S. application Ser. No. 726,915 filed Apr. 4, 1985, now abandoned, which was a continuation application of U.S. application Ser. No. 452,924 filed Dec. 27, 1982, now abandoned.

FIELD OF THE INVENTION

This invention relates to control systems in general, and more particularly to a turbocharger control system for controlling the operations of turbochargers utilized in conjunction with automotive vehicle engines.

DESCRIPTION OF THE PRIOR ART

In conventional turbocharger control systems of this type, when air pressure in an air flow passage from a compressor to a throttle valve rises abnormally, an actuator positioned in a different location serves to actuate a waste gate valve to be opened in response to the air pressure in the air flow passage so that the operation of the turbocharger may be interrupted. Thus, a pipe member forming the flow passage can be prevented from being damaged by means of interruption of operation of the turbocharger. However, such conventional systems adopt a normally closed type of waste gate valve. As a result, if problems occur in the actuator, in a valve connected with the actuator and/or in other mechanical devices during the operation of the turbocharger, the waste gate valve will be maintained in a closed mode. Therefore, though the turbocharger still operates in case of the occurrence of such problems, it may be impossible to discontinue operation of the turbocharger according to demand, thereby damaging or destroying pipe member portions, where air pressure rises abnormally, in particular the pipe member of the air flow passage leading from the compressor to the throttle valve.

SUMMARY OF THE INVENTION

An object of the present invention, therefore, is to eliminate the disadvantages of prior art turbocharger control systems.

More particularly, it is an object of the present invention to provide a turbocharger control system having a normally open type waste gate valve which is maintained opened in case problems occur in an actuator actuating the waste gate valve or in devices attached to the actuator.

Another object of the present invention is to provide a turbocharger control system wherein construction of the actuator and the waste gate valve utilize a mechanical method of operation.

Still another object of the present invention is to provide a new and improved turbocharger control system, utilizing comparatively simple mechanical components, which is economical to manufacture and thoroughly reliable in operation.

In one illustrative embodiment of the present invention, there is provided a turbocharger control system, utilized in internal combustion engines, which includes a bypass passage connecting an exhaust passage, leading from an engine exhaust manifold to a turbocharger turbine, with a downstream passage of the turbocharger turbine. That is to say, the bypass passage is positioned so as to be capable of bypassing exhaust gases directly to an exhaust treatment device around the turbocharger turbine. A waste gate valve is connected to an actuator by means of a link mechanism so that the valve may close the bypass passage. The actuator comprises a first chamber communicating constantly with atmospheric pressure, a second chamber communicating with a passage leading from a turbocharger compressor to a throttle valve, and a third chamber communicating with an engine intake manifold. A first spring mechanism is interposed in the first chamber to bias the waste gate valve toward the closed position thereof. On the other hand, in the third chamber there is provided a second spring mechanism which has a heavier spring characteristic than the first spring mechanism and biases the waste gate valve toward the opened position thereof.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference chracters designate like or corresponding parts throughout the several views and wherein.

DETAILED DESCRIPTION OF THE PREFERRED EMBODIMENTS

Figure 1:
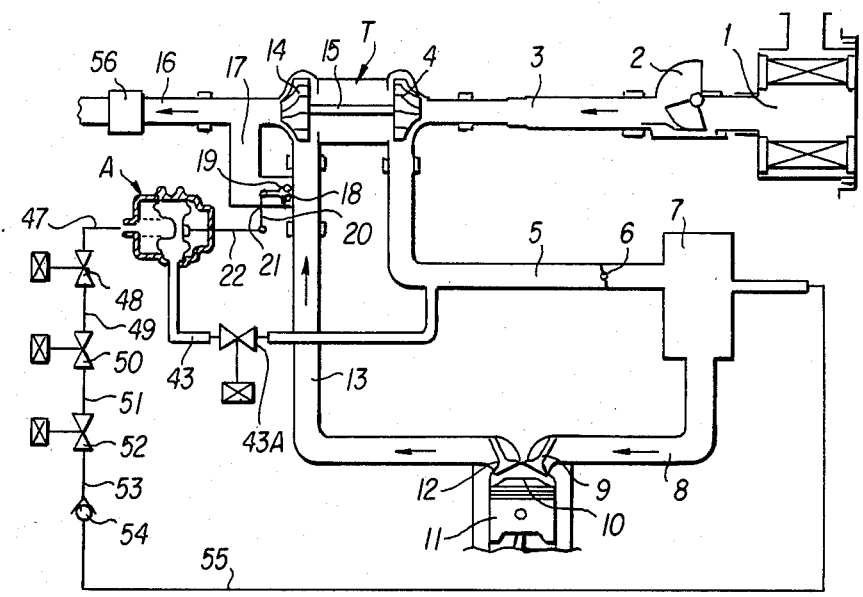
FIG. 1 is a partially diagrammatic, cross-sectional representation of a turbocharger control system as incorporated into an internal combustion engine in accordance with the invention.

Referring now to FIG. 1, so as to measure the amount of air flow, close to an air cleaner 1 there is provided an air flow meter 2 communicating with a compressor 4 of a turbocharger T through an air flow passage 3. The air flow in the passage 3 is pressurized by the compressor 4 and then sent to an air flow passage 5 in which a throttle valve 6 is positioned so as to adjust the amount of air flow communicated to the passage 5. In order to absorb pulsating pressure, installed close to the throttle valve 6 is a surge tank 7 communicating through an intake passage 8 with an engine conbustion chamber 10 which consists of a piston 11 performing reciprocating motion, an intake valve 9 and an exhaust valve 12. When the exhaust valve 12 is maintained so as to be opened, the combustion chamber 10 will communicate through an exhaust passage 13 with a turbine 14 of the turbocharger T.

The turbine 14 is connected to the compressor 4 through a shaft 15 so that the turbine 14 may drive the compressor 4 directly through the shaft 15. The exhaust gases passing through the turbine 14 are exhausted outside through a passage 16. Positioned between the passages 13 and 16 is a bypass passage 17 connecting passage 13 with passage 16 so as to be capable of bypassing the exhaust gases from the combustion chamber 10 directly to an exhaust treatment device 56, such as a catalytic convertor, around the turbine 14 of the turbocharger T.

At one end portion of the bypass passage 17 there is reciprocably mounted a waste gate valve 19 which is movable from a closed position shown in the drawing to an opened position, thereby controlling the opening and closing state of bypass opening 18. The waste gate valve 19 is driven to be in the closed and opened positions by means of a link 20 which pivots on a pin 21 functioning as a fulcrum and is connected with a link 22 which is pivotally connected with a shaft 31 of an actuator A through a hole 31a formed on the shaft 31 as shown in FIG. 2.

Figure 2:
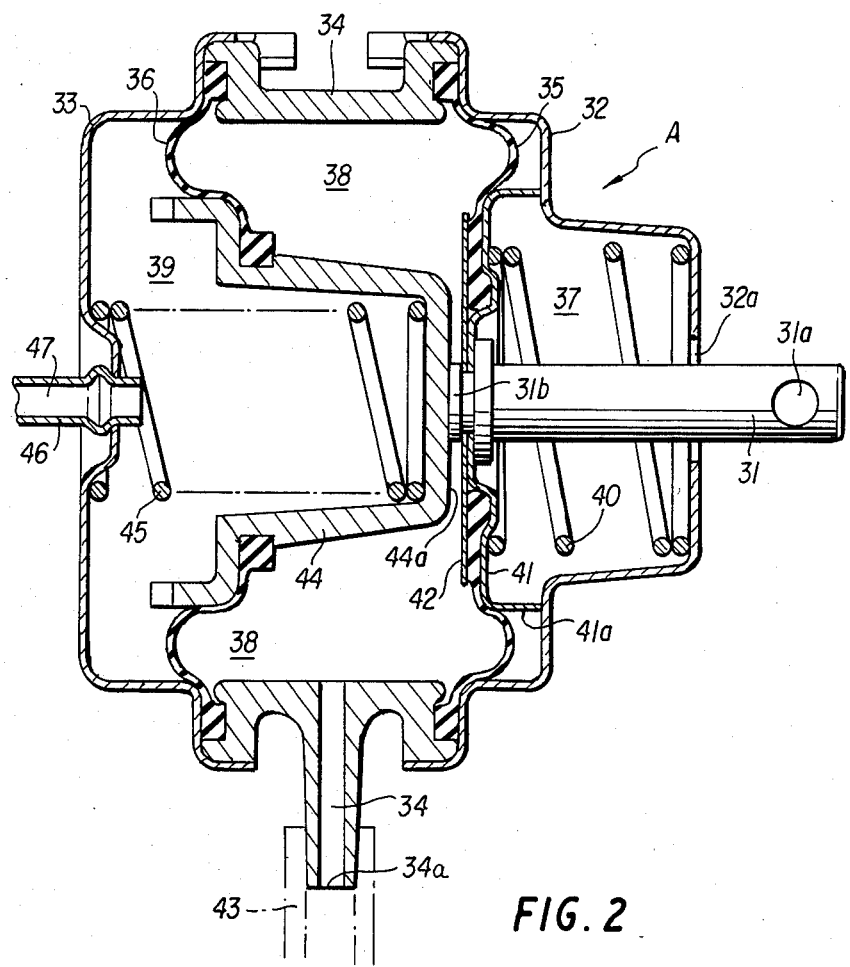
FIG. 2 is a cross-sectional, front elevational enlarged view of an actuator A shown in FIG. 1.

Referring next to FIG. 2, the actuator A includes a body member 34 to which a first housing member 32 and a second housing member 33 are connected in any convenient manner. The interior of the actuator A is divided into a first chamber 37, a second chamber 38 and a third chamber 39 by means of a first diaphragm 35 and a second diaphragm 36 which are fabricated from rubber or other suitable flexible material. The periphery of the first diaphragm is rigidly secured between the first housing member 32 and the body member 34, while the periphery of the second diaphragm is rigidly secured between the second housing member 33 and the body member 34. A first coil spring 40 is axially located within the first chamber 37 communicating constantly with the atmospheric pressure. One end of the spring 40 engages the first housing member 32, while the other end of the spring 40 biases the first diaphragm 35 leftwardly as shown in the drawing.

The inner circumferential portion of the first diaphragm 35 is supported by means of a first supporting plate 41 engaging the spring 40 and a second supporting plate 42 which are fixedly secured to the shaft 31 by a securing member 31b. The first supporting plate 41 is provided with a projecting end portion 41a being engageable with the first housing member 32 so that the end portion 41a may function as a stopper limiting the rightward movement of the first diaphragm 35.

The second chamber 38 communicates with the above-mentioned passage 5 through a port 34a formed in the body 34 and a passage 43 to which a conventional pressure responsive valve 43A is connected to introduce the air pressure of the passage 5 into the second chamber 38 only when the air pressure rises beyond a predetermined value, for example beyond 810 mmHg.

The third chamber 39 is defined by the second housing 33, the second diaphragm 36 and a supporting member 44 supporting the inner circumferential portion of the diaphragm 36. The supporting member 44 is biased rightwardly by a biasing force of a second coil spring 45 disposed within the third chamber 39.

FIG. 2 shows a condition where a right end face 44a of the supporting member 44 is maintained so as to engage the left end face of the shaft 31. The biasing force of the second spring 45 is set so as to be larger than that of the first spring 40. The third chamber 39 communicates at all times with a passage 47 formed in a pipe member 46 which is connected to the surge tank 7 through a solenoid valve 48, a passage 49, a thermal responsive valve 50, a passage 51, a vacuum response valve 52, a passage 53, a one-way check valve 54 and a passage 55 which are connected seriatim. These valves 48, 50, 52, 54 conduct the vacuum to the third chamber 39 in response to the conditions of the engine so that the actuator A may drive the waste gate valve 19 so as to be in its closed position.

When an ignition switch is held in its ON position, the solenoid valve 48 interlocking the ignition switch works to allow the vacuum supplied to the passage from the engine intake manifold to enter into the third chamber 39 of the actuator A. Conversely, when the ignition switch is held in its OFF position, the solenoid valve 48 works to connect the third chamber 39 to atmospheric pressure. When the cooling water temperature of the radiator of the vehicle rises beyond 50° C., the thermal responsive valve 50 works to introduce the vacuum to passage 49 from passage 51. When the cooling water temperature of the radiator of the vehicle is lower than 50° C., the thermal responsive valve 50 works to introduce atmospheric pressure to passage 49 and prevent the introduction of vacuum to passage 49 from passage 51. When the vacuum in the intake manifold drops below 500 mm Hg of vacuum in vacuum gauge, the vacuum responsive valve 52 serves to introduce the vacuum to passage 51 from passage 53. When the vacuum is increased to over 500 mm Hg of vacuum in vacuum gauge, the vacuum responsive valve 52 serves to introduce the atmospheric pressure to passage 51 and prevent the introduction of vacuum to passage 51 from passage 53. Furthermore, the one-way check valve 54 works to allow air or gas to flow only in the direction from the passage 53 to the passage 55. Thus, only when all the four above-mentioned valves 48, 50, 52 and 54 are maintained in the opened position, the vacuum can be supplied to the third chamber 39 from the engine intake mainfold via all three valves 48, 50, 52, the one-way check valve 54 and passages 55, 53, 51, 49, 47.

In operation, when the ignition switch is held in its ON position and the engine is rotating, under such condition, when the air pressure in the air flow passage 5 drops below 50 mm Hg of air pressure and all three valves 48, 50 and 52 are held in the position of introducing the vacuum from passage 55 to third chamber 39, the shafts 31 is pushed leftwardly by the bias of spring 40 due to the introduction of the vacuum to the third chamber 39 and air pressure to a second chamber 38, respectively. Therefore, the waste gate valve 19 is maintained in the closed position by the leftward movement of the shaft 31, thereby blocking the bypass of the exhaust gases to the convertor through the bypass opening 18. As a result, the turbine 14 of the turbocharger T is rotated by the exhaust gases discharged into the passage 13 from the combustion chamber 10. That is to say, all exhaust gas flow crosses the turbine 14 so as to increase the operating speed of the compressor 4 and the intake manifold pressure so that maximum engine torque may be developed.

When the accelerator is released suddenly during engine operation at a high velocity of revolution, the throttle valve 6 is immediately closed and the air pressure in the passage 5 then increases rapidly. It is also to be noted that when the engine is running at a high velocity of revolution, the compressor speed may be increased correspondingly. In this case also, the air pressure in the passage 5 will increase abnormally. Therefore, the air pressure in the passage 5 can be supplied to the second chamber 38 of the actuator A with relationship to the opened position of the valve 43A so that the air pressure may overcome the biasing force of the first and second springs 40, 45, thereby pushing the shaft 31 rightwardly and maintaining the waste gate valve 19 in the opened position, resulting in the fact that the exhaust gases do not provide a rotating force to the turbine 14, namely that the exhaust gases do not increase the turbine speed. Accordingly, since the turbocharger T is thus held in its nonoperation condition when the air pressure in the passage 5 increases abnormally, the pipe members forming the passage 5 can be prevented from being damaged by means of interrupting the operation of the turbocharger T. It is here noted that the waste gate valve 19 may be in its intermediate position except in the fully opened and closed positions. In case of the intermediate position depending on the air pressure of the passage 5, the operating effect of the turbocharger T is such that it is maintained in a middle state.

When the ignition switch is maintained in the OFF position and then the engine is turned off, the solenoid valve 48 does not operate, thereby preventing vacuum from entering into the third chamber 39. Since at this time the air pressure becomes equal to atmospheric pressure, the actuator A is maintained in the position shown in FIG. 2, thereby maintaining the waste gate valve in the opened position.

Even if the vacuum is not supplied to the third chamber 39 of the actuator A due to problems occurring in one of the four valves 48, 50, 52, 54, the shaft 31 is moved to the rightward end position by the biasing force of the spring 45 so as to maintain the waste gate valve 19 in the normally opened position as long as mechanical movements can occur in the actuator A and in the waste gate valve 19.

It will thus be apparent that the invention provides a turbocharger control system, utilized in an internal combustion engine, which includes a bypass passage 17 connecting an exhaust passage, leading from a combustion chamber to a turbocharger turbine, with a downstream passage of the turbocharger turbine. A waste gaste valve is connected to an actuator by means of a link mechanism so that the valve may close the bypass passage. The actuator comprises a first chamber continuously communicating with atmospheric pressure and enclosing a first spring means therewithin so as to bias the waste gate valve toward its closed position, a second chamber communicating with a passage between a turbocharger compressor and a throttle valve of a carburetor, and a third chamber connected to an engine intake manifold and enclosing a second spring means therewithin having a heavier load than the first spring means and biasing the waste gate valve toward its opened position. Accordingly, even if the vacuum is not supplied to the third chamber from the engine intake manifold due to some problem occurring in each kind of valves connected to the third chamber, the waste gate valve is maintained in the opened position by a biasing force of the second valve means as long as mechnical movements can be assured of the actuator and the waste gate valve. As a consequence, during occurrence of the problem, the turbocharger can be prevented from operating, thereby reducing greatly the damage to pipe members forming the passage from the compressor to the throttle valve in comparison with a conventional turbocharger control system wherein the turbocharger is operating during occurrence of such problem.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A turbocharger control system utilized in an internal combustion engine having a turbocharger turbine with a downstream passage, a combustion chamber, an exhaust treatment device, an actuator, a link mechanism connected to said actuator, a compressor, a throttle valve, an engine intake manifold, air flow passage means leading from said compressor to said throttle valve and an exhaust passage leading from said combustion chamber, said system comprising:

bypass passage means connecting said exhaust passage leading from said combustion chamber to said turbocharger turbine with said downstream passage of said turbine so as to connect said combustion chamber directly to said exhaust treatment device around said turbine;

a waste gate valve connected to said actuator by means of said link mechanism so as to close said bypass passage wherein said actuator comprises a first chamber continuously communicating with atmospheric pressure, a second chamber connected to said air flow passage means leading from said compressor to said throttle valve, and a third chamber connected to said engine intake manifold;

first spring means interposed in said first chamber for biasing said waste gate valve toward a closed position; and second spring means interposed in said third chamber and having a stronger spring load characteristic than said first spring means for biasing said waste gate valve towards an opened position.

2. A turbocharger control system according to claim 1, further comprising control valve means interconnecting said third chamber and said engine for conducting a vacuum to said third chamber in response to temperature and pressure conditions of said engine.

3. A turbocharger control system according to claim 2, wherein said control valve means further comprises a solenoid valve interlocking an ignition switch, a thermal responsive valve for responding to a cooling water temperature of a radiator in said engine, a vacuum pressure responsive valve responding to a vacuum in said engine intake manifold, and a one-way check valve permitting said vacuum to be introduced only in the direction from said engine intake manifold to said third chamber which are connected in series with one another.

4. A turbocharger control system according to claim 1, further comprising pressure responsive valve means connecting said second chamber to said air flow passage means so as to communicate air pressure in said air flow passage means to said second chamber when said air pressure in said air flow passage means rises beyond a predetermined value.

5. A turbocharger control system according to claim 1 wherein said bypass passage means further comprises an opening formed therein for bypassing said turbine and further comprising means for reciprocably mounting said waste gate valve at one end portion of said bypass passage and for controlling opening and closing of said bypass opening.

6. A turbocharger control system according to claim 1 wherein said actuator has a hole formed therein and said link mechanism further comprises a pin, a first link pivotably mounted on said pin acting as a fulcrum and a seond link connected to said first link and pivotally connected with said actuator through said hole formed in said actuator.

7. A turbocharger control system according to claim 1 wherein said actuator further comprises a first and second diaphragm disposed therein and wherein said first, second and third chambers are defined by said first diaphragm and said second diaphragm.

8. A turbocharger control system according to claim 7 further comprising supporting plate means fixedly secured to an actuator shaft of said actuator for supporting said first diaphragm of said actuator.

9. A turbocharger control system according to claim 8 wherein said supporting plate means further comprises a projecting stopper end portion for limiting movement of said first diaphragm in a predetermined direction.

* * * * *